Nov. 22, 1927.     1,650,378
J. F. O'CONNOR
CAR CONSTRUCTION
Filed Dec. 27, 1921
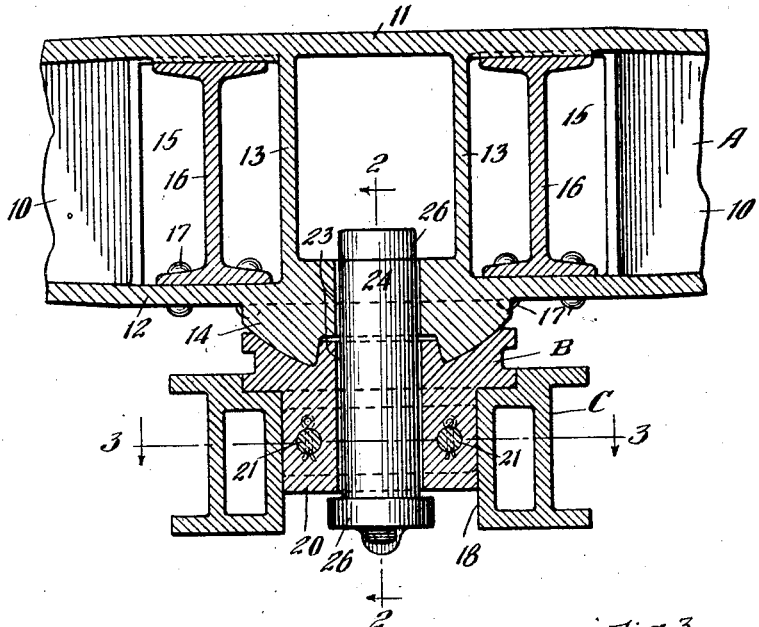
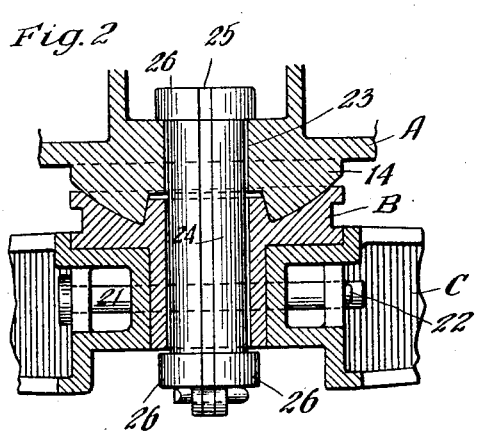
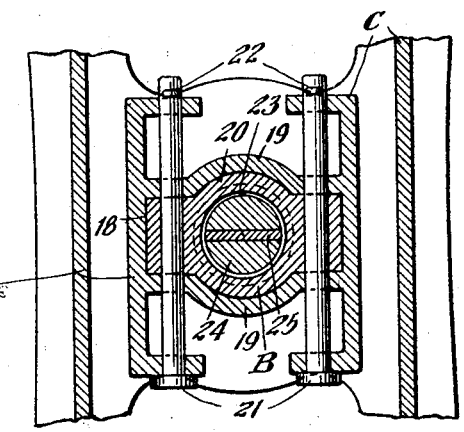
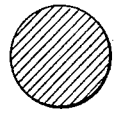
Witnesses
Wm. Geiger
Inventor
John F. O'Connor
By Geo. I. Haight
His Atty Patented Nov. 22, 1927.

1,650,378

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

CAR CONSTRUCTION.

Application filed December 27, 1921. Serial No. 525,018.

This Invention relates to improvements in car construction.

In the operation of railroads, experience has demonstrated that it is highly advisable to so connect the body and truck bolsters of a car that they cannot separate vertically in event of collision or derailment since this effectually prevents or minimizes turning over or telescoping of the cars. The use of such locking means is therefore gradually increasing and spreading to all classes of cars. No especial difficulty has been experienced in applying proper locking means to cars employing four-wheel trucks since ample space is available beneath the pivotal or king pin connection of the bolsters. In the case of six-wheel trucks however, and particularly dining, buffet and baggage cars, much difficulty has been experienced in applying any suitable type of bolster locking device for the reason that the central axle of the six-wheel truck is located immediately below the pivotal center and it is impossible to obtain access from above the bolsters through the car floor on account of the stoves or other fixtures of the car being located directly over the bolsters.

Furthermore, certain railroads prefer using cast body bolsters having a continuous top web over the king pin opening and hence in such cars having six-wheel trucks, it is impossible to insert or withdraw vertically, a king pin of the locking type unless the truck is practically completely dismantled for the purpose, which is prohibitive from a practical standpoint.

One object of my invention is to provide a bolster locking connection of an efficient type and more particularly for those cases where access from above or below the king pin opening is practically impossible.

Another object of the invention is the provision of an improved bolster and king pin arrangement applicable to all conditions, to permit application of a king pin of either the usual type or of the locking type.

Other objects of the invention will more clearly appear from the description and claims hereinafter following.

In the drawing forming a part of this specification, Figure 1 is a vertical, transverse, sectional view of a car taken through the pivotal connection of the body and truck bolsters and showing my improvements in connection therewith. Figure 2 is a longitudinal, vertical, sectional view corresponding to the section line 2—2 of Figure 1. And Figure 3 is a horizontal, sectional view corresponding to the section line 3—3 of Figure 1.

In said drawing, the body bolster is indicated at A, the same being of the cast type and having diaphragm sections 10—10, top web 11, integral bottom web 12, vertical webs 13—13, and an integral center bearing section 14. Rectangular opening 15 are formed within the body bolster to accommodate a pair of I-beam center sills 16—16 which are riveted to the bolster as indicated at 17—17.

A cast truck bolster C of spider form is shown, the same having a centrally disposed opening or socket 18 of the contour best indicated in Figure 3 where it will be noted that the same is of generally rectangular form with outwardly curved bulges 19—19 at the center. The socket 18 is adapted to receive a correspondingly shaped shank 20 formed integral with an independent or detachable center bearing section B having the top face thereof conformed to cooperate with the under face of the body bolster center bearing section 14. The shank 20 of the center bearing section B is detachably secured to the truck bolster C by suitable means, as for instance the longitudinally extending headed pins 21—21 which are passed through alined openings in said shank and the web sections of the bolster C. Said pins 21 are held against accidental removal by cotters 22 as clearly indicated in the drawing.

The center bearing sections 14 and B are provided with vertically extending alined openings 23—23 at their centers to accommodate a locking center pin which preferably consists of two outer semi-cylindrical sections 24—24 and an interposed spreader plate 25. Each of the pin sections 24 is provided at the top and bottom thereof with laterally extended semi-cylindrical flanges 26—26 which overlie the corresponding adjacent shoulders provided by the body bolster A and the lower edge of the detachable center bearing section B. The pin sections 24 and the flanges thereof are so made that the two sections are insertable through the king pin openings when the spreader plate 25 is not present and, when the spreader plate is present, the parts will substantially fully occupy the king pin openings, thus locking the two center bearing sections together while at the same time freely allowing turning movements of the truck bolster with respect to the car body.

By reference to Figure 1, it will be seen that the top web 11 of the body bolster positively precludes the insertion or removal of a king pin from any point above the bolster. The same condition arises in the case of bolsters not having such a top web where the bolsters are applied to dining cars and certain other types of cars where the fixtures in the car prevent the use of an opening through the floor. In Figure 2 of the drawing, the central axle of the six-wheel truck is properly indicated and it will be noted that the same is located immediately below the king pin opening so that the insertion or removal of the king pin from the under side of the truck bolster is thus prevented.

With my arrangement, it will be seen that the center bearing section B may be assembled and interlocked with the body bolster A independently of the truck and hence the latter may be run under the car body and the center bearing section B dropped into the socket of the truck bolster C. The final action is then obtained by inserting the pins 21, as will be understood. In separating the truck from the car body, the reverse procedure takes place, as will be obvious.

With the arrangement shown, vertical separation of the car body from the truck is positively prevented, thus minimizing the damaging effects arising from derailment or wreck.

I have herein shown and described what I now consider the preferred manner of carrying out the invention but I am aware that various changes and modifications may be made without departing from the spirit of the invention. All such changes and modifications that come within the scope of the claims are contemplated.

I claim:

1. In car construction, the combination with a body bolster and a truck bolster, the body bolster having a center bearing section permanently associated therewith; of an independent center bearing section cooperable with said center bearing section of the body bolster, said independent center bearing section being rigidly but detachably associated with the truck bolster; and a center pin for locking said independent bearing section and said body bolster center bearing section against vertical separation while permitting relative rotation therebetween, said center pin being detachable with reference to both of said center bearing sections.

2. In car construction, the combination with a body bolster and a truck bolster, the body bolster having a center bearing section permanently associated therewith; of an independent center bearing section cooperable with said center bearing section of the body bolster, said independent center bearing section being rigidly but detachably associated with the truck bolster; and detachable means for locking said independent center bearing section against accidental vertical separation from the other center bearing section while at the same time allowing relative rotation therebetween, said means extending through both said independent and said other center bearing sections and being detachable with reference to both of the same.

3. In car construction, the combination with a body and a truck bolster, said truck bolster having a centrally disposed vertically extending socket and the body bolster provided with a center bearing section rigidly associated therewith; of an opposed cooperable center bearing section having a shank fitting within said socket and detachably fixed to the truck bolster.

4. In car construction, the combination with a body and a truck bolster, said truck bolster having a centrally disposed vertically extending socket and the body bolster provided with a center bearing section rigidly associated therewith; of an opposed cooperable center bearing section having a shank fitting within said socket and detachably fixed to the truck bolster; and detachable means for locking said detachable center bearing section against accidental vertical separation from the other center bearing section while at the same time allowing relative rotation therebetween.

5. In car construction, the combination with a truck bolster having a vertically extending opening at the center thereof; of a center bearing section having a vertically extending member fitting within said opening and detachably secured to said truck bolster and held against movement relatively thereto; and a body bolster having a cooperable center bearing section.

6. In car construction, the combination with a truck bolster; of a center bearing section rigidly but detachably connected to said bolster, said center bearing fitting within the truck bolster and having a horizontal stop shoulder coacting with the latter.

7. In car construction, the combination with a truck bolster; of an independent center bearing section seated within the truck bolster and provided with a horizontal stop shoulder engaging the latter; and means for detachably but rigidly connecting said center bearing section and bolster.

8. In a car having a body bolster, the center of which is inaccessible from a point above the bolster, and a six-wheel truck including a truck bolster and axle located below the center of the bolster, the combination with a center bearing section detachably associated with said truck bolster; and means for pivotally connecting said center bearing section with the body bolster and preventing vertical separation thereof.

9. In car construction, the combination with a cast body bolster having a top web at the center thereof and an integral center bearing section; center sills extending through said bolster on opposite sides of the center thereof; a truck bolster; and a center bearing section detachably connected to said truck bolster.

In witness that I claim the foregoing I have hereunto subscribed my name this 12th day of December, 1921.

JOHN F. O'CONNOR.